(12) United States Patent
Larsen et al.

(10) Patent No.: US 7,745,031 B2
(45) Date of Patent: Jun. 29, 2010

(54) SOLID OXIDE FUEL CELL

(75) Inventors: Peter Halvor Larsen, Roskilde (DK);
Mogens Bjerg Mogensen, Lynge (DK);
Soren Linderoth, Roskilde (DK); Kent Kammer Hansen, Olstykke (DK);
Weiguo Wang, Ningbo (CN)

(73) Assignee: Technical University of Denmark, KGS. Lyngby (DK)

( * ) Notice: Subject to any disclaimer, the term of this patent is extended or adjusted under 35 U.S.C. 154(b) by 505 days.

(21) Appl. No.: 11/570,320

(22) PCT Filed: Jun. 9, 2005

(86) PCT No.: PCT/DK2005/000379

§ 371 (c)(1),
(2), (4) Date: Dec. 8, 2006

(87) PCT Pub. No.: WO2005/122300

PCT Pub. Date: Dec. 22, 2005

(65) Prior Publication Data

US 2007/0269701 A1 Nov. 22, 2007

(30) Foreign Application Priority Data

Jun. 10, 2004 (DK) .............................. 2004 00904
Feb. 2, 2005 (DK) .............................. 2005 00159

(51) Int. Cl.
H01M 4/82 (2006.01)
H01M 8/10 (2006.01)
H01M 8/00 (2006.01)
B05D 5/12 (2006.01)
H01G 9/02 (2006.01)

(52) U.S. Cl. .............................. 429/33; 429/12; 429/30; 427/115; 252/62.2; 29/623.5

(58) Field of Classification Search ................. None
See application file for complete search history.

(56) References Cited

U.S. PATENT DOCUMENTS 4,209,147 A    6/1980   Jones, Jr.

(Continued)

FOREIGN PATENT DOCUMENTS

CA         2440288         3/2004

(Continued)

OTHER PUBLICATIONS

Kim, J-H. et al., "Fabrication and characteristics of anode-supported flat-tube solid oxide fuel cell," J. Power Sources (2003) 122(2):138-143.

(Continued)

*Primary Examiner*—Melvin C Mayes
*Assistant Examiner*—Sarah Van Oudenaren
(74) *Attorney, Agent, or Firm*—Michael Best & Friedrich LLP

(57) ABSTRACT

SOFC cell comprising a metallic support 1 ending in a substantially pure electron conducting oxide, an active anode layer 2 consisting of doped ceria, ScYSZ, Ni—Fe alloy, an electrolyte layer 3 consisting of co-doped zirconia based on oxygen ionic conductor, an active cathode layer 5 and a layer of a mixture of LSM and a ferrite as a transition layer 6 to a cathode current collector 7 of single phase LSM. The use of a metallic support instead of a Ni—YSZ anode support increases the mechanical strength of the support and secures redox stability of the support. The porous ferrite stainless steel ends in a pure electron conducting oxide so as to prevent reactivity between the metals in the active anode which tends to dissolve into the ferrite stainless steel causing a detrimental phase shift from ferrite to austenite structure.

26 Claims, 2 Drawing Sheets

U.S. PATENT DOCUMENTS

| | | | |
|---|---|---|---|
| 4,702,971 A | 10/1987 | Isenberg | |
| 4,957,673 A | 9/1990 | Schroeder et al. | |
| 5,021,304 A | 6/1991 | Ruka et al. | |
| 5,064,734 A | 11/1991 | Nazmy et al. | |
| 5,358,735 A | 10/1994 | Kawasaki et al. | |
| 5,670,270 A | 9/1997 | Wallin et al. | |
| 5,788,788 A | 8/1998 | Minh | |
| 5,803,934 A | 9/1998 | Carter | |
| 5,846,664 A | 12/1998 | Third et al. | |
| 5,908,713 A | 6/1999 | Ruka et al. | |
| 6,017,647 A | 1/2000 | Wallin et al. | |
| 6,048,636 A | 4/2000 | Naoumidis et al. | |
| 6,099,985 A | 8/2000 | Elangovan et al. | |
| 6,232,009 B1 | 5/2001 | Batawi et al. | |
| 6,248,468 B1 | 6/2001 | Ruka et al. | |
| 6,280,868 B1 | 8/2001 | Badwal et al. | |
| 6,458,170 B1 | 10/2002 | Visco et al. | |
| 6,592,787 B2 | 7/2003 | Pickrell et al. | |
| 6,605,316 B1 | 8/2003 | Visco et al. | |
| 6,682,842 B1 | 1/2004 | Visco et al. | |
| 6,783,880 B2 | 8/2004 | Christiansen | |
| 6,843,960 B2 | 1/2005 | Krumpelt et al. | |
| 6,844,099 B1 | 1/2005 | Gorte et al. | |
| 6,936,217 B2 | 8/2005 | Quadadakkers et al. | |
| 6,958,196 B2 | 10/2005 | Gorte et al. | |
| 7,351,488 B2 | 4/2008 | Visco et al. | |
| 2001/0029231 A1 | 10/2001 | Gorte et al. | |
| 2002/0048699 A1 | 4/2002 | Steele et al. | |
| 2002/0122967 A1 | 9/2002 | Gorina et al. | |
| 2002/0127455 A1 | 9/2002 | Pham et al. | |
| 2002/0182468 A1 | 12/2002 | Janousek et al. | |
| 2003/0015431 A1 | 1/2003 | Barker et al. | |
| 2003/0035989 A1 | 2/2003 | Gorte et al. | |
| 2003/0059335 A1 | 3/2003 | Quadadakkers et al. | |
| 2003/0059668 A1 | 3/2003 | Visco et al. | |
| 2003/0082434 A1 | 5/2003 | Wang et al. | |
| 2003/0134171 A1 | 7/2003 | Sarkar et al. | |
| 2003/0165726 A1 | 9/2003 | Robert et al. | |
| 2003/0178307 A1 | 9/2003 | Sarkar | |
| 2003/0186101 A1 | 10/2003 | Christansen et al. | |
| 2003/0224234 A1 | 12/2003 | Steele et al. | |
| 2003/0231973 A1 | 12/2003 | Krumpelt et al. | |
| 2003/0232230 A1 | 12/2003 | Carter et al. | |
| 2003/0235752 A1 | 12/2003 | England et al. | |
| 2004/0033405 A1 | 2/2004 | Barnett et al. | |
| 2004/0043269 A1 * | 3/2004 | Taniguchi et al. | 429/30 |
| 2004/0053101 A1 | 3/2004 | Chartier et al. | |
| 2004/0060967 A1 | 4/2004 | Yang et al. | |
| 2004/0115503 A1 | 6/2004 | Jacobson et al. | |
| 2004/0183055 A1 | 9/2004 | Chartier et al. | |
| 2004/0209147 A1 | 10/2004 | Finkenwirth et al. | |
| 2005/0089739 A1 | 4/2005 | Seccombe et al. | |
| 2005/0181253 A1 | 8/2005 | Finnerty et al. | |
| 2006/0024547 A1 | 2/2006 | Waldbillig et al. | |
| 2008/0096079 A1 | 4/2008 | Linderoth et al. | |
| 2008/0118635 A1 | 5/2008 | Larsen | |
| 2008/0124602 A1 | 5/2008 | Larsen et al. | |
| 2008/0142148 A1 | 6/2008 | Nielsen et al. | |
| 2008/0166618 A1 | 7/2008 | Larsen et al. | |

FOREIGN PATENT DOCUMENTS

| | | |
|---|---|---|
| CN | 1409427 | 4/2003 |
| CN | 1997229 | 7/2007 |
| DE | 4237602 | 5/1994 |
| DE | 19650704 | 6/1998 |
| DE | 19710345 | 1/1999 |
| DE | 19836132 | 2/2000 |
| EP | 0446680 | 9/1991 |
| EP | 1065020 | 1/2001 |
| EP | 1255318 | 11/2002 |
| EP | 1306920 | 5/2003 |
| EP | 1318560 | 6/2003 |
| EP | 1383195 | 1/2004 |
| GB | 1313795 | 4/1973 |
| GB | 2400723 | 10/2004 |
| JP | 2004319286 | 11/2004 |
| WO | WO 92/15122 | 9/1992 |
| WO | WO 98/49738 | 11/1998 |
| WO | WO 99/56899 | 11/1999 |
| WO | WO 02/09116 | 1/2002 |
| WO | WO 02/073729 | 9/2002 |
| WO | WO 03/036739 | 5/2003 |
| WO | WO 03/069705 | 8/2003 |
| WO | WO 03/075382 | 9/2003 |
| WO | WO 03/105252 | 12/2003 |
| WO | WO 04/001885 | 12/2003 |
| WO | WO 2004/013925 | 2/2004 |
| WO | 2004030133 | 4/2004 |
| WO | WO 2004/030130 | 4/2004 |
| WO | 2004079033 | 9/2004 |
| WO | WO 2006/069753 | 7/2006 |
| WO | WO 2006/074932 | 7/2006 |
| WO | WO 2006/079558 | 8/2006 |
| WO | WO 2006/082057 | 8/2006 |
| WO | WO 2007/025762 | 3/2007 |

OTHER PUBLICATIONS

Xia, C. et al., "Functionally graded cathodes for honeycomb solid oxide fuel cells," Electrochem. Solid-State Letters (2002) 5(10):A217-A220.

Young, R.C. et al., "Symposium BB: Materials and Technologies for a Hydrogen Economy," Materials Research Society Symposium Proceedings Series (Nov. 30, 2003) pp. 709-717.

Donald, I.W. "Preparation, properties and chemistry of glass and glass-ceramic-to-metal seals and coatings," J. Mat. Sci. (1993) 28:2841-2886.

Dyck, C.R. et al., "Synthesis and characterization of $Gd_{(1-x)}Sr_xCoO_{(1-y)}Fe_yO_{(3-\delta)}$ as a cathode material for intermediate temperature solid oxide fuel cells," Mat. Res. Soc. Symp. Proc. (2004) 801:113-118.

Gut, B. et al., "Anode supported PEN for SOFC. Pressed substrates for spray pyrolysed and co-sintered electrolyte; redox stability and alternative anode," Jahresbericht (2001) 1-6.

Klemensø, T. et al., "The mechanism behind redox instability of anodes in high-temperature SOFCs," Electrochemical Society Journal (2005) 152(11):A2186-A2192.

Matus, Y. et al., "Metal-supported solid oxide fuel cell membranes for rapid thermal cycling," Solid State Ionics (2005) 176:443-449.

Nadler, J.H. et al., "Oxide reduction and sintering of Fe-Cr alloy honeycombs," J. Mat. Research (2003) 18(8):1787-1794.

Zhang, Y. et al., "Redox cycling of Ni-YSZ anode investigated by TPR technique," Solid State Ionics (2005) 176:2193-2199.

International Search Report and Written Opinion from International Searching Authority for PCT/DK2005/000379 dated Dec. 16, 2005 (14 pages).

European Patent Office Search Report for European Application No. 062024339 dated Feb. 2, 2007 (2 pages).

International Search Report and Written Opinion from International Searching Authority for PCT/EP2005/013968 dated Mar. 28, 2006 (10 pages).

International Preliminary Report on Patentability from International Searching Authority for PCT/EP2005/013968 dated Mar. 30, 2007 (10 pages).

International Search Report and Written Opinion from International Searching Authority for PCT/EP2006/000229 dated Mar. 15, 2006 (9 pages).

International Search Report and Written Opinion from International Searching Authority for PCT/EP2006/000920 dated Sep. 22, 2006 (10 pages).

International Search Report and Written Opinion from International Searching Authority for PCT/EP2006/000813 dated Mar. 29, 2006 (10 pages).

International Preliminary Report on Patentability from International Searching Authority for PCT/EP2006/000813 dated May 18, 2007 (10 pages).

United States Office Action for U.S. Appl. No. 11/814,356 dated May 1, 2008 (7 pages).

International Search Report from International Searching Authority for PCT/EP2006/008537 dated Aug. 8, 2007 (3 pages).

Notice of Allowability with Office Action for U.S. Appl. No. 11/814,356 dated Jul. 6, 2009 (7 pages).

United States Office Action for U.S. Appl. No. 11/814,356 dated Jan. 26, 2009 (7 pages).

Han, M-F. et al., "Manufacturing processes of solid oxide fuel cell," China Academic Journal Electronic Publishing House (2001) 10:1195-1198.

* cited by examiner

SOLID OXIDE FUEL CELL

CROSS-REFERENCE TO RELATED APPLICATIONS

This patent application is a national stage filing under 35 U.S.C. 371 of International Application No. PCT/DK2005/000379, filed 9 Jun. 2005, which claims foreign priority to Danish Patent Application No. 2004 00904, filed 10 Jun. 2004, and Danish Patent Application No. 2005 00159, filed 2 Feb. 2005, the disclosures of which are incorporated by reference herein in their entireties.

TECHNICAL FIELD

The invention relates to a solid oxide fuel cell (SOFC) comprising a metallic support.

BACKGROUND ART

US 2002/0048 699 concerns a solid oxide fuel cell comprising a ferritic stainless steel substrate including a porous region and a non-porous region bounding the porous region. A ferritic stainless steel bipolar plate is located under one surface of the porous region of the substrate and is sealingly attached to the non-porous region of the substrate above the porous region thereof. A first electrode layer is located over the other surface of the porous region of the substrate and an electrolyte layer is located over the first electrode layer and a second electrode layer is located over the electrolyte layer. Such a solid oxide fuel cell is relatively cheap. However it is not sufficiently robust.

BRIEF DESCRIPTION OF THE INVENTION

The object of the invention is to provide a solid oxide fuel cell which is relatively cheap and at the same time more robust than previously known.

The SOFC cell according to the invention comprises
a metallic support material,
an active anode layer consisting of a good hydrocarbon cracking catalyst,
an electrolyte layer,
an active cathode layer and
a transition layer consisting of preferably a mixture of LSM and a ferrite to the cathode current collector,
means being provided for preventing diffusion between the metallic support and the active anode.

The use of a metallic support instead of a Ni—YSZ (Yttria stabilized zirconia) anode support increases the mechanical strength of the support and secures redox stability of the support.

A problem when using a metallic support is that during sintering (which takes place at relatively high temperatures) electrode material from the active anode layer interdiffuses with the metallic support, causing for instance a detrimental phase transformation of the support from a ferritic to an austenite phase.

According to the invention this may be avoided, either by making the metallic support as a graded cermet structure ending in an electron conducting oxide, or by making the active anode layer as a porous layer into which the active anode material is impregnated after sintering.

In a special embodiment according to the invention the cell comprises a ferritic metal support consisting of a graded, layered cermet structure ending in a substantially pure electron conducting oxide,
an active anode layer consisting of a good hydrocarbon catalyst, such as a mixture of doped ceria and Ni—Fe alloy,
an electrolyte layer,
an active cathode layer,
a transition layer consisting preferably of a mixture of LSM ($La_xSr_{1-x}MnO_3$) and a ferrite and ending in
a cathode current collector, preferably consisting of single phase LSM.

The FeCr porous support has on all internal and external surfaces an oxide layer which may be formed either by oxidation in a suitable atmosphere of the Fe—Cr alloy itself or by coating the alloy. The purpose of this coating is to inhibit deposition of carbon and tars. The composition of the coating may be based on e.g. $Cr_2O_3$, $CeO_2$, $LaCrO_3$, $SrTiO_3$. In any case the base oxide should be suitably doped.

The SOFC cell according to the invention may be provided with a reaction barrier layer of doped ceria between the electrolyte layer and the active cathode said reaction layer having a thickness of 0.1-1 µm. The barrier layer prevents diffusion of cations from the cathode to the electrolyte. As a result the life time may be increased.

According to the invention the active cathode may consist of a composite of one material chosen among scandia and yttria stabilized zirconia (ScYSZ) or doped ceria and one material chosen among, LSM, lanthanide strontium manganate (LnSrMn) or lanthanide strontium iron cobalt oxide (LnSrFeCo), $(Y_{1-x}Ca_x)Fe_{1-y}Co_yO_3$, $(Gd_{1-x}Sr_x)_sFe_{1-y}Co_yO_3$ or $(Gd_{1-x}Ca_x)_sFe_{1-y}Co_yO_3$. Such a cathode material performs better than other cathode materials.

According to the invention the electrolyte layer may consist of a co-doped zirconia based oxygen ionic conductor. Such an electrolyte has a higher oxygen ionic conductivity than YSZ and a better long time stability than ScSZ. Doped ceria may be used alternatively.

According to the invention the SOFC cell may comprise a ferritic stainless steel support, an active composite anode layer consisting of a good hydro carbon cracking catalyst, such as Ni-alloys and a suitable ion conductor such as doped ceria or ScYSZ, an electrolyte layer, and active cathode layer and a transition layer consisting preferably of a mixture of LSM and a ferrite to the cathode current collector, preferably consisting of single phase LSM.

In a special embodiment the metallic support may consist of a FeCrMx alloy. Mx is an alloying element such as Ni, Ti, Ce, Mn, Mo, W, Co, La, Y, Al. Concentrations are kept below the level of austenite formation, where relevant.

In another special embodiment the active anode may consist of a porous layer of 8YSZ, co-doped zirconia or co-doped ceria. 0-50% metal alloy may be added.

BRIEF DESCRIPTION OF THE DRAWING

The invention will be explained in the following with reference to the drawings in which.

BEST MODES FOR CARRYING OUT THE INVENTION

Figure 1:
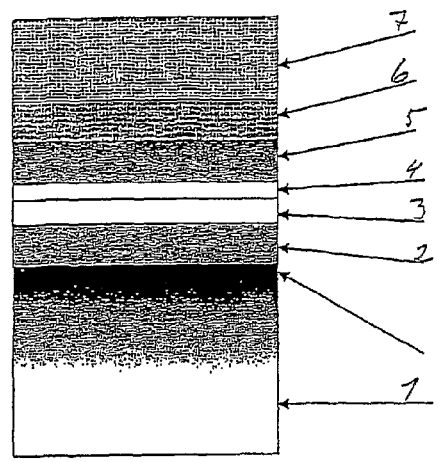
FIG. 1 illustrates a robust intermediate temperature SOFC cell according to the invention

The solid oxide fuel cell SOFC according to the invention is shown in FIG. 1. The cell comprises a metallic support 1 ending in a substantially pure electron conducting oxide, an active anode layer 2 consisting of doped ceria or ScYSZ, Ni—Fe alloy, an electrolyte layer 3 consisting of a co-doped zirconia or ceria based oxygen ionic conductor, an active cathode layer 5 and a layer of a mixture of LSM and a ferrite layer as a transition layer 6 to a cathode current collector 7 of preferably single phase LSM or LnSrMnCo (or a porous metal current collector).

The backbone of the complete solid oxide fuel cell which consists of seven functional layers is a functional graded porous metal cermet structure 1 consisting of porous ferritic stainless steel and an electron conducting oxide e.g. $(Sr_{1-x}La_x)_sTi_{1-y}Nb_yO_3$ (LSTN) where $0 \leq x \leq 0.4$, $0.5 \leq s \leq 1$ and $0 \leq y \leq 1$. Another example of such an oxide is $(La_{1-x}Sr_x)CrO_3$ (LSC). Another example is $Sr(La)Ti(Nb)O_3$ (LSTN)+FSS (e.g. Fe22Cr). In general any electron conducting oxide (n- or p-type conductor) with a thermal expansion coefficient approximately matching the thermal expansion coefficient of the metal may be used. The alloy surface (internal as well as external) is coated with a layer of electron conducting oxide in order to prevent cracking of the hydrocarbon in the porous anode support 1. Cracking of the hydrocarbon should only take place in the active anode as hydrocarbon cracking in the porous support may precipitate carbon leading to plugging of the porosities.

The use of a metallic support 1 instead of a Ni—YSZ anode support increases the mechanical strength of the support and secures redox stability of the support. The porous ferritic stainless steel 1 ends in pure electron conducting oxide, e.g. LSC or LSTN ($Sr(La)Ti(Nb)O_3$) so as to prevent reactivity between the metals in the active anode 2, especially Ni or NiO, which tends to dissolve into the ferritic stainless steel causing a possible detrimental phase shift from ferritic to austenitic structure. The diffusion may also take place in the opposite direction in that elements from the metal support may diffuse into the anode.

The active anode layer 2 is a graded structure of doped ceria+ScYSZ+Ni—Fe-alloy, which only contains a few % nano-sized metal catalyst, which is a good hydrocarbon cracking catalyst. The thickness of this layer is 1-50 μm.

The active anode 2 is fabricated from solid solutions of NiO and $FeO_x$ or mixtures thereof in ScYSZ and LSTN. This preparation assures a few percent of nano-sized Ni—Fe catalyst after reduction in the operating fuel cell. This allows for a high surface area of the catalyst, and agglomeration of the catalyst is prevented as the catalyst particles are kept at a distance from each other. The small amounts of high surface area nickel and iron allows for fast kinetics of cracking and conversion of the hydrocarbons and for efficient electrochemical conversion of hydrogen. Only by keeping the catalyst finely dispersed the formation of carbon nano-tubes is avoided when hydrocarbons are used as a fuel. The finely dispersed catalyst is formed when the active anode is reduced. As the anode only contains a few percent of catalyst it will be redox stable (as only a minor part of the anode will show redox activity). Redox cycling may eventually revive the nanostructure of Ni—Fe catalysts. The anode 2 contains a significant amount of ceria, which has the ability to catalyse the electrochemical oxidation of the carbon, which may be formed as a result of the cracking process.

The electrolyte layer 3 consists of a co-doped zirconia based oxygen ionic conductor (Y,Sc)SZ (Yttria, Scandia Stabilised Zirconia). This type of electrolyte has a higher oxygen ionic conductivity than YSZ and a better long-term stability than ScSZ. Doped ceria may be used alternatively.

The active cathode 5 for a cell with an operation temperature of 550° C. may be fabricated from a composite of one material chosen among ScYSZ possibly doped with Ce or doped ceria (e.g. gadolinia doped ceria, CGO), and one material chosen among $(Y_{1-x}Ca_x)Fe_{1-y}Co_yO_3$, $(Gd_{1-x}Sr_x)_sFe_{1-y}Co_yO_3$, $(Gd_{1-x}Ca_x)_sFe_{1-y}Co_yO_3$. Another example is a graded composite $(Y,Ca)FeCoO_3$ and doped zirconia or ceria. Such a cathode 5 shows a performance superior to LSM and other cathode materials, cf. FIG. 2. The substitution on the A-site with Y and Ca instead of the commonly used cations La and Sr improves both the performance and the stability of the cathode. The stability is improved as the formation of non-conducting zirconates ($La_2Zr_2O_7$ and $SrZrO_3$) are avoided when using Y and Ca instead of La and Sr. A reaction barrier layer 4 of doped ceria (preventing diffusion of cations from the cathode to the ScYSZ electrolyte) may be necessary to obtain a sufficiently long life time. For fuel cells operating in the temperature range above 700° C. an LSM–YSZ or (Y,Sc)SZ composite cathode may be used, and in this case the ceria barrier layer 4 is not needed.

On top of the active cathode layer 5 a graded layer 6 consisting of a mixture of LSM and ferrite or LSM+(Y,Ca)FeCoO_3 is placed as a transition to the cathode current collector 7 of single phase LSM ($La(Sr)MnO_3$) or LSFCo ($La_{1-x}Sr_xFe_{1-y}Co_yO_{3-\delta}$), as this has the highest electron conductivity. The function of the transition layer 6 is to prevent high local thermal stresses due to a small difference in thermal expansion coefficient between LSM and ferrite. This layer can be avoided when LSM/YSZ is used as a cathode.

Figure 2:
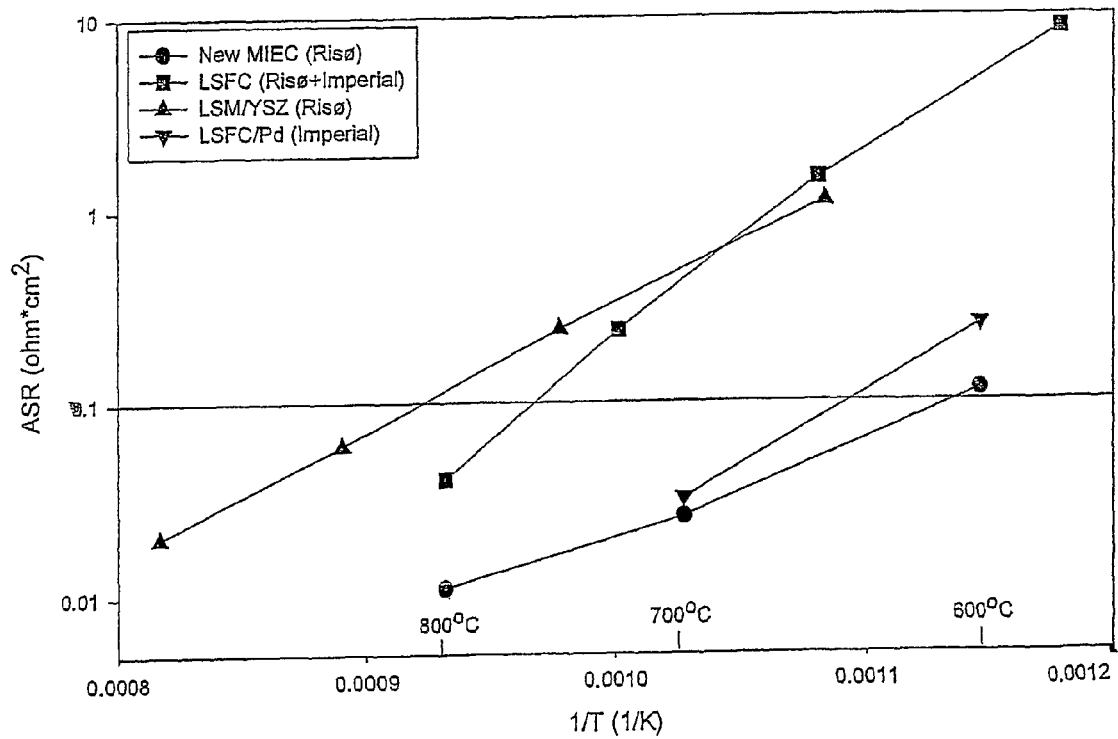
FIG. 2 illustrates area specific resistances of various cathode materials incl. the cathode material used in the SOFC cell according to the invention.

FIG. 2 illustrates an Arrhenius plot of various cathodes performances given as area specific resistances (ASR). It appears that GSFCo-ferrite is as good as a cathode containing a noble metal catalyst.

Figure 3:
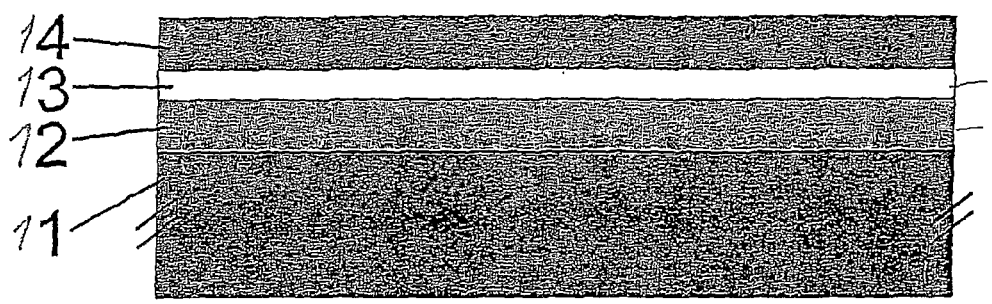
FIG. 3 illustrates a SOFC cell with anode impregnation layer.

Alternatively an SOFC could be produced with porous electrode impregnation layer(s), so as to omit diffusion between metallic support and the active anode, cf. FIG. 3, layers 11-13.

Layer 11: Metallic support (200-2000 μm), FeCrMx alloys with 0-50 vol % oxide (e.g. doped zirconia, doped ceria or other oxides, such as $Al_2O_3$, $TiO_2$, MgO, CaO, $Cr_2O_3$ or combinations thereof, but not limited to such materials). The addition of oxide serves several purposes: 1) enhances the chemical bonding between anode layer and metal support 2) adjusts the thermal expansion coefficient and 3) controls the sinter ability and grain growth.

Layer 12: Porous layer for impregnation of the anode (20-100 μm), Sc—Y—Ga—Ce doped zirconia/Sm—Gd—Y or any Ln element or CaO doped ceria with or without addition of a metal alloy (FeCrMx). In case of addition of a metal support material, the layer will possess oxygen-ion conductivity (doped zirconia/ceria) as well as electronic conductivity (metal). In the case of doped ceria the layer will also have some electro catalytic effect. The anode is completed by impregnation of an electro catalytic component after sintering (Ni with or without doped ceria or any other electro catalyst).

Layer 13: Standard electrolyte (~10 μm), similar ionic conducting materials as for layer 12 or $LaGaO_3$-based electrolyte.

Layer 14: Full cell; there are two different options as listed below for FIGS. 3 and 5.

FIG. 3: Ordinary spraying or screen-printing of cathode.

Figure 5:
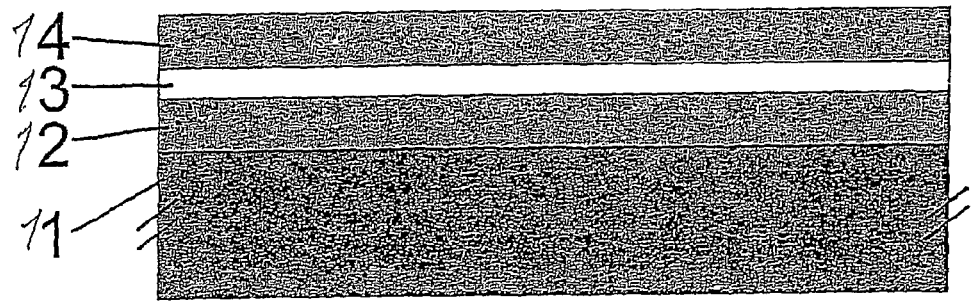
FIG. 5 illustrates a SOFC cell with double electrode impregnation layer.

FIG. 5: Impregnation of second porous layer 14 with cathode.

The following advantages are obtained by applying impregnation:
1. Simple, no anode/metal support barrier layer required.
2. Cheap process—only one sintering is required in the case of double impregnation layer.
3. Sintering is done without the presence of Ni, hence coarsening during sintering is not an issue.
4. Impregnation offers the possibility of obtaining electrodes with high surface areas.
5. Chemical reaction between the electrode material and the other cell materials are prevented/reduced because the operational temperature is lower than the sintering temperature.
6. The composite structure of the impregnation layer ensures a good mechanical bonding between electrolyte and metal support as well as good conductivity across the interfaces.

Examples will be given in the following.

Example 1

First step is tape casting of a paste with a composition of Fe-22% Cr ferritic stainless steel with a thickness of 1 mm.

Second step is to tape cast a composite consisting of a 80 wt % $(Sr_{0.8}La_{0.2})_{0.95}Ti_{0.9}Nb_{0.1}O_3$ and 20 wt % Fe-22% Cr paste with a thickness of 5-50 μm on top of the Fe—Cr ferritic steel.

Third step is to spray $(Sr_{0.8}La_{0.2})_{0.95}Ti_{0.9}Nb_{0.1}O_3$ in a thickness of 5-50 μm.

Fourth step is to spray the active anode slurry in a thickness of 10 μm. The composition of the slurry is 50 wt % $Y_{0.04}Sc_{0.16}Zr_{0.8}O_2$ and 50 wt % $Sr_{0.84}Ni_{0.05}Fe_{0.1}TiO_3$.

Fifth step is to spray the electrolyte with a composition of $Y_{0.04}Sc_{0.16}Zr_{0.8}O_2$ in a thickness of 5 μm.

Sixth step is to co-sinter the resulting half-cell at 1300° C. in a reducing atmosphere, 9% $H_2$+91% Ar.

Seventh step is to spray the barrier layer consisting of $Ce_{0.9}Gd_{0.1}O_{1.95}$ in a thickness of 0.2 μm followed by sintering at 700° C.

Eighth step is to coat the Fe—Cr alloy.

Ninth step is to spray the cathode consisting of 50 wt % $(Gd_{0.6}Sr_{0.4})_{0.99}Co_{0.2}Fe_{0.8}O_3$ and 50 wt % $Y_{0.04}Sc_{0.16}Zr_{0.8}O_2$ in a thickness of 20 μm.

Tenth step is to spray 50 wt % $(La_{0.85}Sr_{0.15})_{0.95}MnO_3$ and 50 wt % $(Gd_{0.8}Sr_{0.4})_{0.99}Co_{0.2}Fe_{0.8}O_3$ in a thickness of 1-30 μm.

Eleventh step is to screen print the current collector consisting of $(La_{0.85}Sr_{0.15})_{0.95}MnO_3$ with a thickness of 50 μm.

The cathode and the cathode current collector will be in-situ sintered in the stack.

The resulting solid oxide fuel cell is robust and is flexible as both hydrocarbons and hydrogen can be converted at the anode. The fuel cell converts hydrocarbons by cracking followed by electrochemical oxidation of the cracking products. As an oxidant either air or pure oxygen could be used.

Example 2

First step is tape casting of a paste with a composition of Fe-22% Cr ferritic stainless steel in a thickness of 1 mm.

Second step is to tape cast a composite consisting of a 80 wt % $(Sr_{0.8}La_{0.2})_{0.95}Ti_{0.9}Nb_{0.1}O_3$ and 20 wt % Fe-22% Cr paste with a thickness of 5-50 μm on top of the Fe—Cr ferritic steel.

Third step is to spray $(Sr_{0.8}La_{0.2})_{0.95}Ti_{0.9}Nb_{0.1}O_3$ in a thickness of 5-30 μm.

Fourth step is to spray the active anode slurry in a thickness of 10 μm. The composition of the slurry is 50 wt % $Y_{0.04}Sc_{0.16}Zr_{0.8}O_{2-\delta}$ and 50 wt % $Sr_{0.84}Ni_{0.05}Fe_{0.05}TiO_3$ Fifth step is to spray the electrolyte with a composition of $Y_{0.04}Sc_{0.16}Zr_{0.8}O_{2-\delta}$ in a thickness of 5 μm.

Sixth step is to co-sinter the resulting half-cell at 1300° C. in a reducing atmosphere, 9% $H_2$+91% Ar.

Seventh step is to spray the barrier layer consisting of $Ce_{0.9}Gd_{0.1}O_{1.95}$ in a thickness of 0.2 μm followed by sintering at 700° C.

Eighth step is to coat the Fe—Cr alloy.

Ninth step is to spray the cathode consisting of 50 wt % $(Gd_{0.6}Sr_{0.4})_{0.99}Co_{0.2}Fe_{0.8}O_{3-\delta}$ and 50 wt % CGO10 in a thickness of 20 μm.

Tenth step is to spray 50 wt % $(La_{0.85}Sr_{0.15})_{0.95}MnO_3$ and 50 wt % $(Gd_{0.6}Sr_{0.4})_{0.99}Co_{0.2}Fe_{0.8}O_3$ in a thickness of 1-30 μm.

Eleventh step is to screen print the current collector consisting of $(La_{0.85}Sr_{0.15})_{0.95}MnO_3$ with a thickness of 50 μm. The cathode will be in-situ sintered in the stack.

The resulting solid oxide fuel cell is robust and is flexible as both hydrocarbons and hydrogen can be converted at the anode. The fuel cell converts hydrocarbons by cracking followed by electrochemical oxidation of the cracking products. As an oxidant either air or pure oxygen could be used.

Example 3

First step is tape casting of a paste with a composition of Fe-22% Cr ferritic stainless steel with a thickness of 1 mm.

Second step is to tape cast a composite consisting of a 80 wt % $(Sr_{0.8}La_{0.2})_{0.95}Ti_{0.9}Nb_{0.1}O_3$ and 20 wt % Fe-22% Cr paste with a thickness of 5-50 μm on top of the Fe—Cr ferritic steel.

Third step is to spray $(Sr_{0.8}La_{0.2})_{0.95}Ti_{0.9}NbO_{0.1}O_3$ in a thickness of 1-30 μm.

Fourth step is to spray the active anode slurry in a thickness of 10 μm. The composition of the slurry is 50 wt % $Y_{0.04}Sc_{0.16}Zr_{0.8}O_{2-\delta}$ and 50 wt % $Sr_{0.84}Ni_{0.05}Fe_{0.1}TiO_3$.

Fifth step is to spray the electrolyte with a composition of $Y_{0.04}Sc_{0.16}Zr_{0.8}O_{2-\delta}$ in a thickness of 5 μm.

Sixth step is to spray the barrier layer consisting of $Ce_{0.9}Gd_{0.1}O_{1.95}$ in a thickness of 0.5 μm.

Seventh step is to co-sinter the resulting half-cell at 1350° C. in a reducing atmosphere, 9% $H_2$+91% Ar.

Eighth step is to coat the Fe—Cr alloy.

Ninth step is to spray the cathode consisting of 50 wt % $(Gd_{0.6}Ca_{0.4})_{0.99}Co_{0.2}Fe_{0.8}O_3$ and 50 wt % CGO10 in a thickness of 20 μm.

Tenth step is to spray 50 wt % $(La_{0.85}Sr_{0.15})_{0.95}MnO_3$ and 50 wt % $(Gd_{0.6}Sr_{0.4})_{0.99}Co_{0.2}Fe_{0.8}O_3$ in a thickness of 1-30 μm.

Eleventh step is to screen print the current collector consisting of $(La_{0.85}Sr_{0.15})_{0.95}MnO_3$ with a thickness of 50 μm. The cathode will be in-situ sintered in the stack.

The resulting solid oxide fuel cell is robust and is flexible as both hydrocarbons and hydrogen can be converted at the anode. The fuel cell converts hydrocarbons by cracking followed by electrochemical oxidation of the cracking products. As an oxidant either air or pure oxygen could be used.

Example 4

First step is tape casting of a paste with a composition of Fe-22% Cr ferritic stainless steel with a thickness of 1 mm.

Second step is to tape cast a composite consisting of a 80 wt % $(Sr_{0.8}La_{0.2})_{0.95}Ti_{0.9}Nb_{0.1}O_3$ and 20 wt % Fe-22% Cr paste with a thickness of 5-50 μm on top of the Fe—Cr ferritic steel.

Third step is to spray $(Sr_{0.8}La_{0.2})_{0.95}Ti_{0.9}Nb_{0.1}O_3$ in a thickness of 1-30 μm.

Fourth step is to spray the active anode slurry in a thickness of 10 μm. The composition of the slurry is 50 wt % $Y_{0.04}Sc_{0.16}Zr_{0.8}O_{2-\delta}$ and 50 wt % $Sr_{0.84}Ni_{0.05}Fe_{0.1}TiO_3$.

Fifth step is to spray the electrolyte with a composition of $Y_{0.04}Sc_{0.16}Zr_{0.8}O_{2-\delta}$ in a thickness of 5 μm.

Sixth step is to co-sinter the resulting half-cell at 1350° C. in a reducing atmosphere, 9% $H_2$+91% Ar.

Seventh step is to spray the cathode consisting of 50 wt % LSM and 50 wt % $Y_{0.04}Sc_{0.16}Zr_{0.8}O_{2-\delta}$ in a thickness of 20 μm.

Eighth step is to screen print the current collector consisting of $(La_{0.85}Sr_{0.15})_{0.95}MnO_3$ with a thickness of 50 μm. The cathode will be in-situ sintered in the stack.

The resulting solid oxide fuel cell is robust and is flexible as both hydrocarbons and hydrogen can be converted at the anode. The fuel cell converts hydrocarbons by cracking followed by electrochemical oxidation of the cracking products. As an oxidant either air or pure oxygen could be used.

Example 5

First step is tape casting of a paste with a composition of Fe22% Cr ferritic stainless steel with a thickness of 1 mm.

Second step is to tape cast a composite consisting of a 80 wt % $(Sr_{0.8}La_{0.2})_{0.95}Ti_{0.9}Nb_{0.1}O_3$ and 20 wt % Fe-22% Cr paste with a thickness of 5-50 μm top of the Fe—Cr ferritic steel.

Third step is to spray $(Sr_{0.8}La_{0.2})_{0.95}Ti_{0.9}Nb_{0.1}O_3$ in a thickness of 1-30 μm.

Fourth step is to spray the active anode slurry in a thickness of 10 μm. The composition of the slurry is 50 wt % $Y_{0.04}Sc_{0.16}Zr_{0.8}O_{2-\delta}$ and 50 wt % $Sr_{0.84}Ni_{0.05}Fe_{0.1}TiO_3$.

Fifth step is to spray the electrolyte with a composition of $Y_{0.04}Sc_{0.16}Zr_{0.8}O_{2-\delta}$ in a thickness of 5 μm.

Sixth step is to co-sinter the resulting half-cell at 1350° C. in a reducing atmosphere, 9% $H_2$+91% Ar.

Seventh step is to spray the cathode consisting of 50 wt % LSM and 50 wt % $Y_{0.04}Sc_{0.16}Zr_{0.8}O_{2-\delta}$ in a thickness of 20 μm.

Eighth step is to screen print the current collector consisting of $(La_{0.85}Sr_{0.15})_{0.95}MnO_3$ with a thickness of 50 μm.

The cathode will be in-situ sintered in the stack.

The resulting solid oxide fuel cell is robust and is flexible as both hydrocarbons and hydrogen can be converted at the anode. The fuel cell converts hydrocarbons by cracking followed by electrochemical oxidation of the cracking products. As an oxidant either air or pure oxygen could be used.

Example 6

Support sheets with a thickness in the range of 200-2000 μm are manufactured by tape-casting a Fe22Cr alloy (+minor constituents such as Mn) powder suspension, cf. FIG. 3. After drying of the support 11 a layer for anode impregnation (layer 12, 50 μm) and finally a electrolyte layer (layer 13, 10 μm) are deposited by spray painting. Both layers have a composition of $Zr_{0.78}Sc_{0.20}Y_{0.02}O_{2-\delta}$. The suspensions for spraying are made so that the impregnation layer 12 has at least 40% porosity with an average pore size of 1-3 μm and the electrolyte is dense after sintering. Samples are subsequently punched out in the desired dimensions, and the so-called half-cells are sintered under controlled reducing conditions. A solution of Ni-, Ce-, Gd-nitrates is impregnated into the porous zirconia layer 12 by vacuum infiltration. The resulting anode will have volume concentration of 40% Ni and 60% $(Gd_{0.1}Ce_{0.9})O_{2-\delta}$. After drying and cleaning of the electrolyte surface a $(Gd_{0.6}Sr_{0.4})_{0.99}(Co_{0.2}Fe_{0.8})O_{3-\delta}$ cathode (layer 14, 40 μm) is deposited by spray painting.

Example 7

Support sheets with a thickness in the range of 200-2000 μm are manufactured by tape-casting a Fe22Cr alloy (with minor additional constituents) powder suspension, cf. FIG. 3. After drying of the support (11) a layer for anode impregnation (layer 12, 50 μm) is deposited by screen-printing an ink comprising a 1:1 volume mixture of $Zr_{0.78}Sc_{0.20}Y_{0.02}O_{2-\delta}$ and FeCr alloy. The addition of metal to the impregnation layer ensures a good bonding between the metal support and the impregnation layer. Finally an electrolyte layer (layer 13, 10-15 μm) is deposited by spray painting. The cell is completed as described in example 6.

Example 8

Support sheets with a thickness in the range of 200-2000 μm are manufactured by tape-casting a Fe22Cr alloy (with minor constituents) powder suspension mixed with 2-10 vol % $Zr_{0.94}Y_{0.06}O_{2-\delta}$, cf. FIG. 3. The cell is completed as described in example 7.

Example 9

Support sheets with a thickness in the range of 200-2000 μm are manufactured by tape-casting a Fe22Cr alloy (with minor constituents) powder suspension, cf. FIG. 3. A graded impregnation layer is made from one or more of thin sheets comprising a mixture of electrolyte material and metal alloy ($FeCrM_x$). Sheets with varying grain sizes and resulting pore sizes and with thicknesses of 30-70 μm are manufactured by tape-casting powder suspensions. The cell structure is made by laminating metal support sheet and 1-4 impregnation layers sheets by rolling or pressing. The resulting impregnation layer is graded in composition with pore size and grain size ranging from 5-10 μm against the metal support down to ~1 μm at the electrolyte interface. The cell is completed as described in Example 6.

Example 10

As example 9, but with the addition of pore formers to control the final porosity of the impregnation layer and metal support.

Example 11

As example 10, but with the addition of sintering additive (15) to control the shrinkage of the layers. Examples of which include, but are not limited to $Al_2O_3$, MgO, CaO, SrO, $CoO_x$, $MnO_x$, $B_2O_3$, $CuO_x$, $ZnO_2$, $VO_x$, $Cr_2O_3$, $FeO_x$, NiO, $MoO_x$, $WO_3$, $Ga_2O_3$ or in combinations thereof.

Example 12

Figure 4:
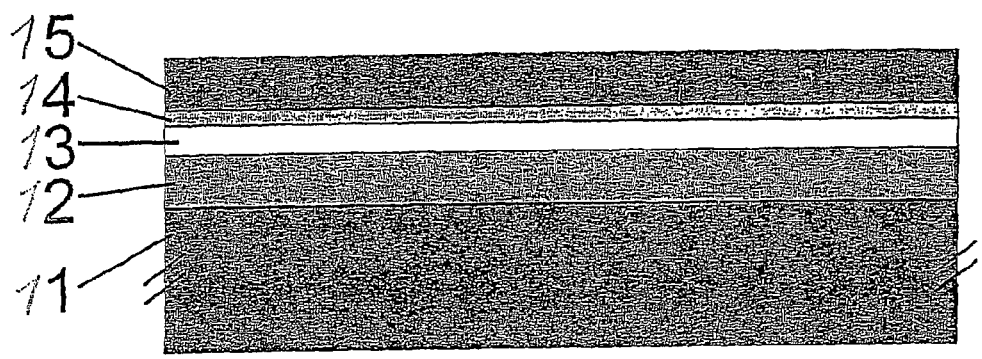
FIG. 4 illustrates a SOFC cell with anode impregnation layer and barrier layer.

A half-cell as described in previous examples is manufactured. A cathode/electrolyte barrier layer 14, (FIG. 4), (0.5 μm) is deposited on the electrolyte surface by spin coating of a Gd—Ce nitrate solution. After sintering of the barrier layer at 700° C. a Ni—$(Gd_{0.1}Ce_{0.9})O_{2-\delta}$ anode is impregnated into layer 12, as described in example 6. After drying and cleaning of the electrolyte surface a $(La_{0.6}Sr_{0.4})_{0.99}(Co_{0.2}Fe_{0.8})O_{3-\delta}$ cathode (layer 5, 40 μm) is deposited by screen printing.

Example 13

Support sheets with a thickness of approximately 800 μm are manufactured by rolling a Fe22 Cr alloy paste, layer 11 in FIG. 3. After drying of the support, a layer for anode impregnation (layer 12) and an electrolyte layer are deposited by screen-printing. Both layers have a composition of $(Sm_{0.1}Ce_{0.9})O_{2-\delta}$. Inks for screen-printing are made so that the impregnation layer has >50% porosity with an average pore size of 1-2 μm and the electrolyte is dense. Samples are subsequently punched out in the desired dimensions and the so-called half-cells are sintered under controlled reducing conditions.

A solution of Ni nitrate is prepared and impregnated into the porous $(Sm_{0.1}Ce_{0.9})O_{2-\delta}$ layer (layer 12) by immersion. After drying and cleaning of the electrolyte surface, a $(La_{0.6}Sr_{0.4})_{0.99}(Co_{0.2}Fe_{0.8})O_{3-\delta}$ cathode (layer 14) is deposited by spray painting.

Example 14

Support sheets with a thickness of approximately 500 μm are manufactured by tape-casting a Fe22Cr alloy powder suspension containing 5 vol % $(Gd_{0.1}Ce_{0.9})O_{2-\delta}$ to enhance the bonding to the impregnation layer, cf. FIG. 3. A layer for anode impregnation (30 μm) and finally an electrolyte layer (10 μm) are deposited by spray painting. Both layers have a composition of $(Gd_{0.1}Ce_{0.9})O_{2-\delta}$. After sintering, a nitrate solution of Ni, Gd and Ce is impregnated into the porous ceria layer by vacuum infiltration. After drying and cleaning of the electrolyte surface, a LSCF cathode is deposited by screen printing.

Example 15

A support is manufactured as explained in Example 8. A layer for anode impregnation (30 μm) comprising Fe—Cr alloy powder and $(Gd_{0.1}Ce_{0.9})O_{2-\delta}$ in a 1:1 volume ratio and a $(Gd_{0.1}Ce_{0.9})O_{2-\delta}$ electrolyte layer (10 μm) are deposited by spray painting. The cell is completed as explained in Example 6.

Example 16

A support is manufactured as explained in Example 6, (layer 11 in FIG. 3). After drying of the support, a layer for electrode impregnation, (layer 12, 70 μm), a $Zr_{0.78}Sc_{0.20}Y_{0.02}O_{2-\delta}$ electrolyte layer, (layer 13, 10 μm), and finally another layer for electrode impregnation, (layer 14, 30 μm), are deposited by spray painting. Both impregnation layers have a composition of $Zr_{0.78}Sc_{0.20}Y_{0.02}O_{2-\delta}$ with 40 vol % FeCr powder with an approximate porosity of ~60% porosity.

Samples are subsequently punched out in the desired dimensions, and the samples are sintered under controlled reducing conditions. Layer 14 is masked and a solution of Ni-Ce-, Gd-nitrates is impregnated into the porous layer 12 by vacuum infiltration. The resulting anode will have a volume concentration of 40% Ni and 60% $(Gd_{0.1}Ce_{0.9})O_{2-\delta}$. After drying the mask on layer 14 is removed, layer 12 is masked and the active cathode material is impregnated by vacuum infiltration in a nitrate solution (resulting cathode composition): $(Gd_{0.6}Sr_{0.4})_{0.99}(Co_{0.2}Fe_{0.8})O_{3-\delta}$.

Example 17

A cell structure is manufactured as described in example 6. The anode layer is made by pressure impregnation of a nano-sized suspension of NiO and $(Gd_{0.1}Ce_{0.9})O_{2-\delta}$.

Example 18

As example 7, but characterised by the use of sintering additives (one or more chosen from, but not limited to, the list given in example 12) that allows suitable sintering of the respective components under oxidising conditions at temperatures below 1100° C.

The invention claimed is:

1. SOFC cell comprising
   a metallic support material,
   an active anode layer comprising a hydrocarbon cracking catalyst,
   an electrolyte layer,
   an active cathode layer, and
   a transition layer comprising a mixture of LSM and a ferrite between the active cathode layer and a cathode current collector with means being provided for preventing diffusion between the metallic support and the active anode, wherein the diffusion between the metallic support and the active anode has been prevented by the metallic support being graded with an electron conducting oxide ending in a substantially pure electron conducting oxide.

2. SOFC cell according to claim 1, wherein the metallic support comprises a metal alloy of the type $FeCrM_x$, $M_x$ being Ni, Ti, Ce, Mn, Mo, W, Co, La, Y or Al.

3. SOFC cell according to claim 1, wherein the active anode layer comprising a hydrocarbon cracking catalyst comprises a mixture of doped ceria and a Ni—Fe alloy.

4. SOFC cell according to claim 1, wherein the transition layer comprises a mixture of LSM and a ferrite, and ends in a cathode current collector consisting of single phase LSM.

5. SOFC cell according to claim 1, further comprising a reaction barrier layer of doped ceria between the electrolyte layer and the active cathode layer.

6. SOFC according to claim 5, wherein the reaction barrier has a thickness of 0.1-1 μm.

7. SOFC cell according to claim 1, wherein the active cathode comprises one material chosen among ScYSZ or doped ceria, and one material chosen among LSM, LnSrMn, LnSrFeCo, $(Y_{1-x}Ca_x)Fe_{1-y}Co_yO_3$, $(Gd_{1-x}Sr_x)Fe_{1-y}Co_yO_3$ or $(Gd_{1-x}Ca_x)_sFe_{1-y}Co_yO_3$.

8. SOFC cell according to claim 1, wherein the electrolyte layer comprises a co-doped zirconia or a co-doped ceria based oxygen ionic conductor.

9. SOFC cell according to claim 8, wherein the electrolyte layer has a thickness of about 0.1-20 μm.

10. SOFC cell according to claim 1, wherein the active anode has a thickness of 1-50 μm.

11. SOFC cell according to claim 1, wherein the transition layer is composed of single phase LSM.

12. SOFC cell according to claim 1, further comprising a coating of the internal and external surfaces of the Fe—Cr $M_x$ metal support, wherein the Fe—Cr $M_x$ metal support is porous.

13. SOFC cell according to claim 1, wherein the metallic support is made of a Fe—Cr containing alloy with an addition of 0-50% metal oxides.

14. SOFC cell comprising
   a metallic support material,
   an active anode layer comprising a hydrocarbon cracking catalyst and an impregnated porous material, said porous material being impregnated after sintering,
   an electrolyte layer,
   an active cathode layer, and
   a transition layer comprising a mixture of LSM and a ferrite between the active cathode layer and a cathode current collector with means being provided for preventing diffusion between the metallic support and the active anode.

15. SOFC according to claim 14, wherein the metallic support material comprises metal oxides selected from the group consisting of doped zirconia, doped ceria, $Al_2O_3$, $TiO_2$, MgO, CaO, $Cr_2O_3$, $FeO_x$ and combinations thereof.

16. SOFC cell according to claim 14, wherein the impregnation layer comprises doped zirconia or doped ceria.

17. SOFC cell according to claim 16, wherein the impregnation layer comprises doped zirconia or ceria mixed with metal alloy.

18. SOFC cell according to claim 14, wherein the electrolyte layer comprises doped zirconia or doped ceria.

19. SOFC cell according to claim 14, wherein the active anode comprises a porous layer of doped zirconia or doped ceria with a metallic catalyst selected from Ni, Ni—Fe, or a combination thereof.

20. SOFC cell according to claim 1, wherein the active cathode layer comprises a mixture of doped zirconia and $XYO_{3-5}$, or doped ceria and $XYO_{3-5}$, wherein X is La, Gd or Sr and Y is Fe or Co.

21. SOFC cell according to claim 1, wherein the active cathode layer comprises a porous layer, into which active cathode is impregnated after sintering.

22. SOFC cell according to claim 21, wherein the impregnation layer comprises doped zirconia or doped ceria.

23. SOFC cell according to claim 22, wherein the impregnation layer comprises doped zirconia or doped ceria mixed with a metal alloy.

24. SOFC cell according to claim 21, wherein the electrolyte comprises doped zirconia or ceria.

25. SOFC cell according to claim 21, wherein the active anode comprises a porous layer of doped zirconia or doped ceria with a metallic catalyst.

26. SOFC cell according to claim 21, wherein the active cathode comprises mixture of doped zirconia and $XYO_{3-5}$, or doped ceria and $XYO_{3-5}$, wherein X is La, Gd or Sr and Y is Fe or Co.

* * * * *